United States Patent [19]

Zison

[11] 4,444,041

[45] Apr. 24, 1984

[54] METHOD AND APPARATUS FOR DETERMINING THE VENTING RATE OF LANDFILL GAS

[75] Inventor: Stanley W. Zison, Irvine, Calif.

[73] Assignee: Getty Synthetic Fuels, Inc., Signal Hill, Calif.

[21] Appl. No.: 410,331

[22] Filed: Aug. 23, 1982

[51] Int. Cl.³ .......................... G01N 7/14; G01N 1/22
[52] U.S. Cl. ...................................... 73/19; 73/864.73
[58] Field of Search .................... 73/19, 863.23, 182, 73/864.73; 239/548, 552; 98/79

[56] References Cited

U.S. PATENT DOCUMENTS

| | | | |
|---|---|---|---|
| 2,701,999 | 2/1955 | Moran | 98/79 |
| 3,862,576 | 1/1975 | Pogorski | 73/863.23 |
| 3,987,677 | 10/1976 | Alter | 73/863.21 |
| 4,026,355 | 5/1977 | Johnson et al. | 166/250 |
| 4,065,972 | 1/1978 | Holub et al. | 73/864.52 |
| 4,276,778 | 7/1981 | Ham | 73/864.43 |

*Primary Examiner*—Gerald Goldberg
*Assistant Examiner*—Hezron Williams
*Attorney, Agent, or Firm*—Gordon L. Peterson

[57] ABSTRACT

A method of measuring the flow of landfill gas from a surface of a landfill comprising placing a receiver having an opening therein on the landfill surface so that the landfill gas can flow through the opening and enter the receiver, conducting the landfill gas from the receiver through a conduit, measuring the flow of the gas in the conduit, and discharging the landfill gas from the conduit to the atmosphere through a dynamic pressure attenuator.

18 Claims, 9 Drawing Figures

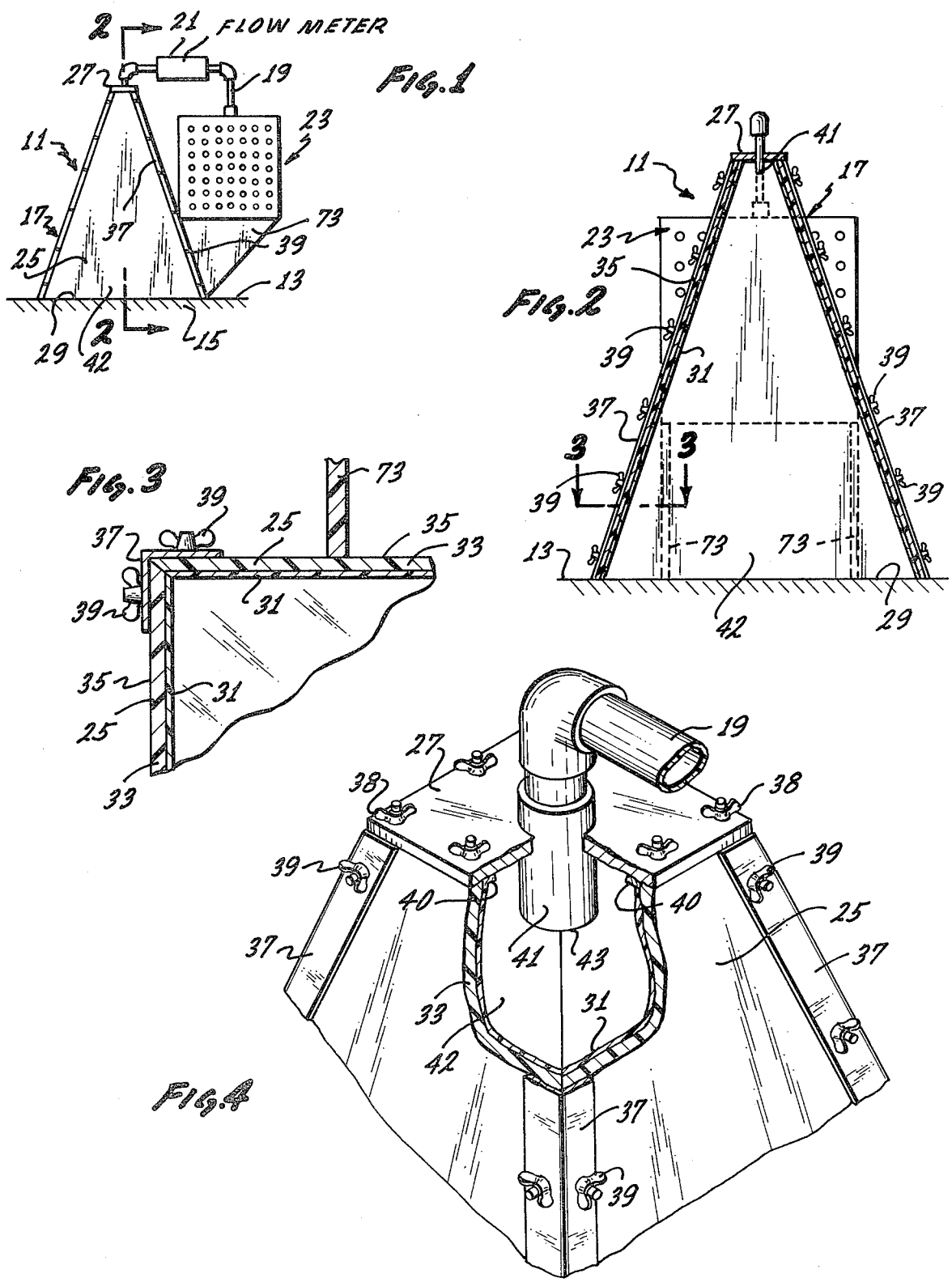

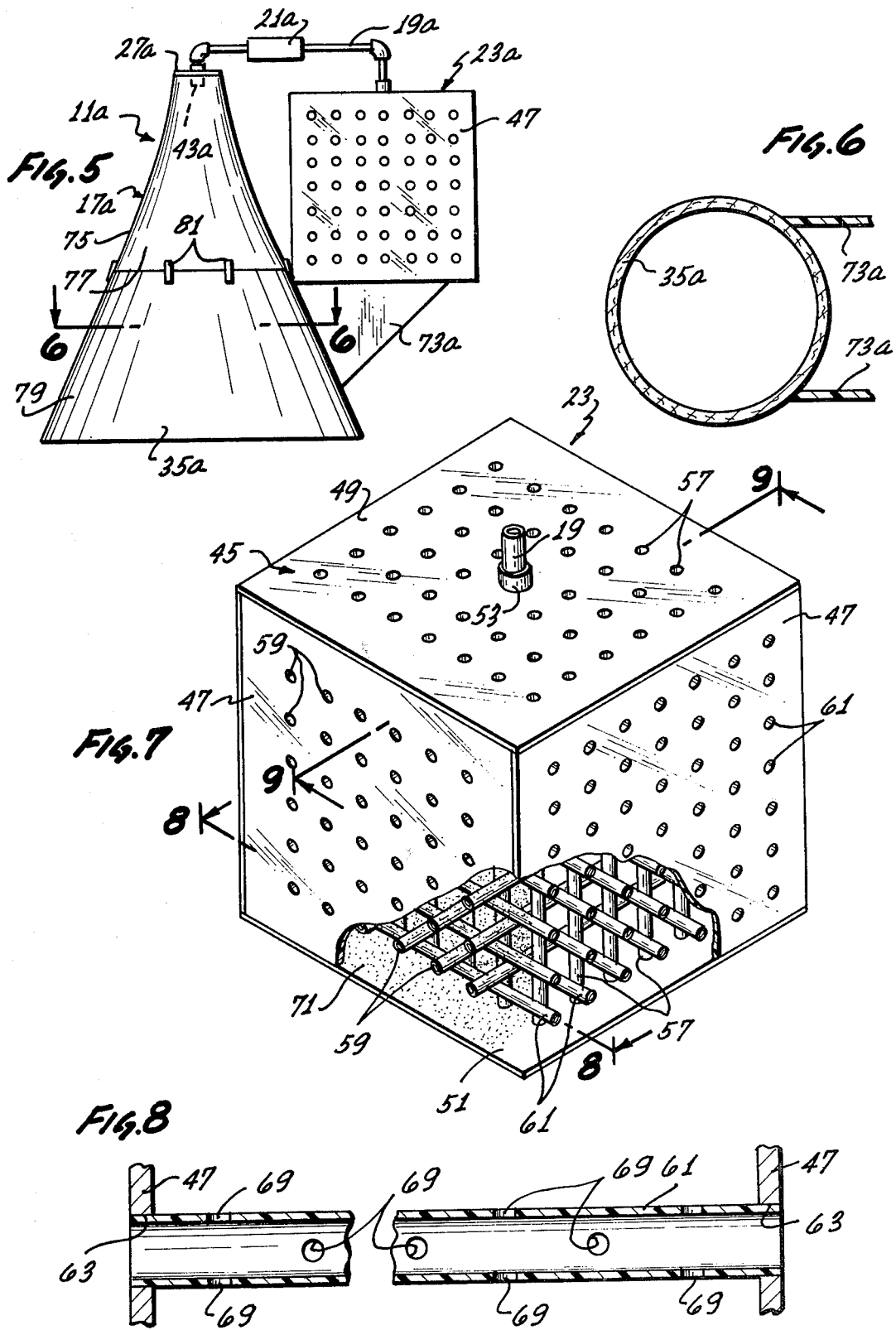

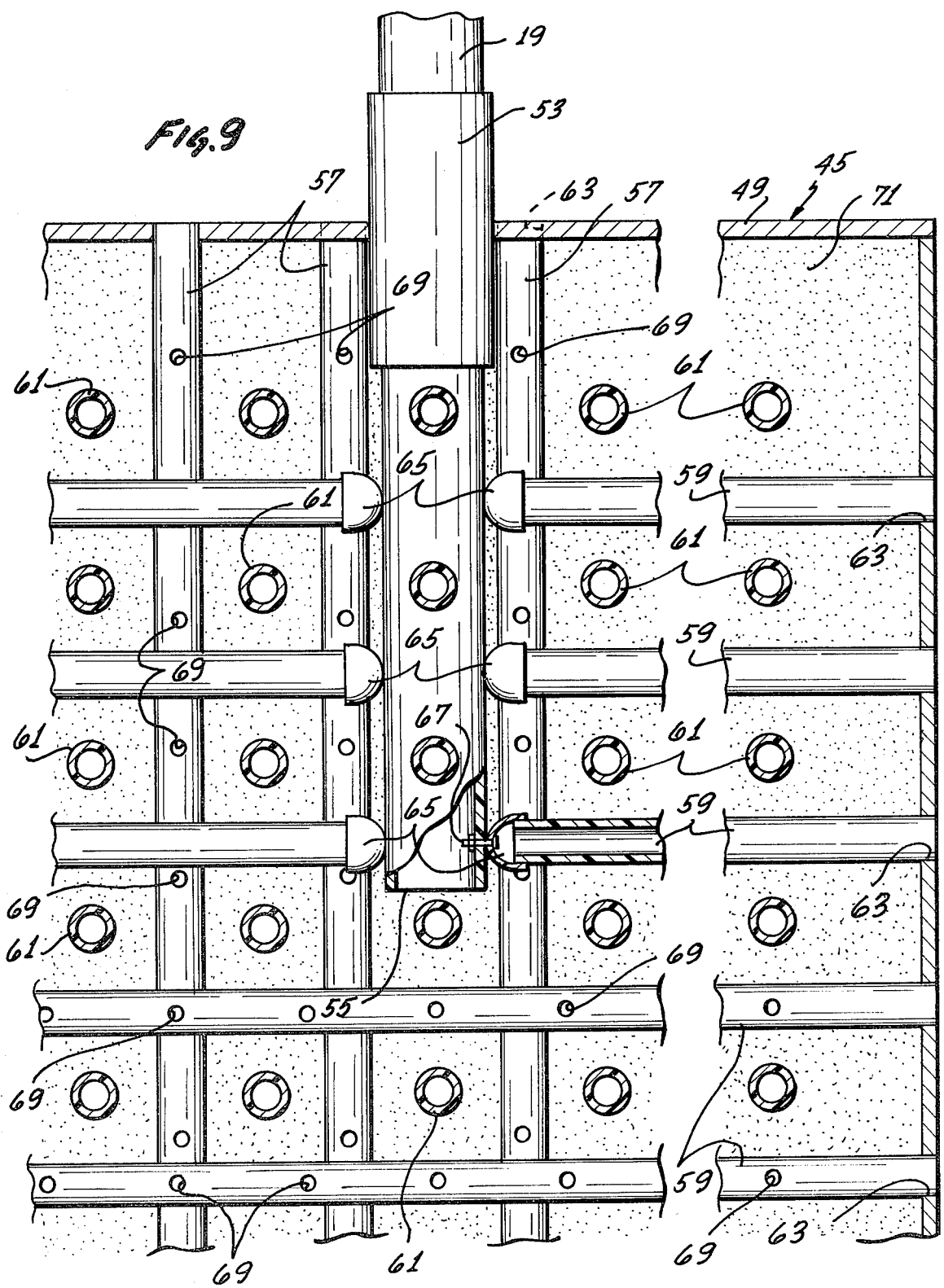

METHOD AND APPARATUS FOR DETERMINING THE VENTING RATE OF LANDFILL GAS

BACKGROUND OF THE INVENTION

Decomposition of materials within a landfill produces landfill gas which contains methane. In some instances, the methane concentration is sufficient to warrant recovery of the landfill gas so that the methane can be used as a fuel. To increase the concentration of methane, a landfill gas purification plant can be installed at the landfill.

The recovery of landfill gas requires a substantial investment for the construction of landfill gas recovery wells. Landfills are not homogeneous and do not produce landfill gas at the same rate at all locations within the landfill. Accordingly, the selection of each landfill gas well site is very important in order to maximize gas production and to minimize the number of wells which cannot be used or cannot be used for long periods due to inadequate production.

One method of locating landfill gas wells is described in Johnson et al. U.S. Pat. No. 4,026,355. Although this method has been used for many years, it would be desirable to have a lower cost method for locating wells at the best possible sites.

Landfill gas is produced by the landfill at a positive pressure. This positive pressure causes the landfill gas to flow upwardly to the upper surface of the landfill and vent to the atmosphere. Another way to locate sites for landfill gas wells is to measure the venting rate of the landfill gas at various regions of the landfill. These regions may be at the landfill's upper surface or, if desired, may be at any region below the upper surface of the landfill.

One approach to measuring landfill gas venting rates is to place a receiver on the landfill surface so that the venting landfill gas can flow into the receiver. A methanometer probe is provided in the receiver so that, based upon gas mixing considerations, the venting rate of the landfill gas can be calculated.

Unfortunately, the measurement of the landfill gas venting rate is plagued with problems, and heretofore the accurate measurement of the landfill gas venting rate has not been attained. For example, wind impinging on the base of the receiver at the interface with the landfill surface may cause a net inflow of air into the receiver and decrease the methane concentration. Wind impinging on any port of the receiver tends to push the gas within the receiver back into the landfill or out into the atmosphere at the landfill surface. Also, the methanometric approach requires that the gas inside be fully mixed or at least the mixing regime be well known, and neither is generally the case. In addition, the methanometric approach may pose a sensitivity problem due to the relatively high lower detection limit of commonly available field methanometers.

The single most important drawback to measuring the landfill gas venting rate is that the collection effeciency is very low. Collection efficiency is equal to the total volume of gas entering the receiver through its base area divided by the total amount of gas which vents over the same area in the absence of the receiver. In some laboratory testing of shallow receivers, collection efficiencies as low as 0.10 percent have been noted.

SUMMARY OF THE INVENTION

This invention provides a method and apparatus for accurately measuring the landfill gas venting rates. With this invention, the methanometric approach is not used, and the problems noted above are solved. Although this invention is particularly adapted for use with measuring landfill gas venting rates or measuring gas flow under low differential pressures and low mass flow rates, it is more broadly applicable to the measurement of the flow of any gas through a surface.

To eliminate the methanometer, this invention measures gas flow directly. The terms gas flow or flow of gas are used herein to mean either or both of flow rate, i.e., velocity and mass flow or any other parameter that is to be measured or determined from either of these. By eliminating the methanometer and using gas flow, the problems discussed above relating to gas mixing and methanometer sensitivity are eliminated.

To measure landfill gas flow, it is normally necessary, in a practical sense, that the collected landfill gas ultimately be discharged to the atmosphere. Ambient air currents or wind provide dynamic pressure which tends to interfere with the passage of the landfill gas through the apparatus to the atmosphere thereby creating inaccuracies in flow measurement. However, with this invention, a suitable dynamic pressure attenuator is provided, and the landfill gas is discharged to the atmosphere through the attenuator. The attenuator materially reduces the effect of the dynamic pressure of the wind on the discharge of the landfill gas and, preferably, imposes no more than negligible back pressure on the landfill gas collection and measuring system. Although various different dynamic pressure attenuators can be used with this invention, the preferred attenuator is described in common assignee's copending application filed on even date herewith and naming Stanley W. Zison and Robert N. Turer as joint inventors.

This invention also provides for greatly increased landfill gas collection efficiency. This feature of the invention is based, in part, upon the recognition that the flow of landfill gas to be measured is very small and that this flow is driven by a very small pressure differential between the landfill gas in the landfill and ambient pressure. With this invention, collection efficiency is materially improved by substantially reducing the internal resistance of the receiver. For this purpose, the receiver provides a flow path which extends between the opening which confronts the landfill surface and the conduit which conducts the landfill gas from the receiver to the flow measurement location. To improve collection efficiency, this flow path preferably converges as it extends away from the opening and is elongated. In this regard, it has been found that a low receiver tends to produce a poor collection efficiency. With this invention, collection efficiencies as high as 75 to 80 percent in laboratory tests have been obtained.

The receiver is placed in proximity to a surface of the landfill so that the gas can flow through the opening and enter the receiver. Preferably, the receiver is placed on the landfill surface with the opening confronting the surface. The surface may be the upper surface of the landfill or a surface provided by excavation, which is below the upper surface of the landfill. To minimize gas expansion due to solar radiation, the exterior surface of the receiver is preferably reflective.

The landfill gas is conducted by a suitable conduit from the receiver to the dynamic pressure attenuator.

Preferably, the gas is allowed to flow out through the top of the receiver although this is not necessary.

The flow of the gas is preferably measured between the receiver and the dynamic pressure attenuator. Any sensitive gas flow measuring device which imposes minimal impedance to gas flow can be utilized. For example, a flow meter, such as a bubble flow meter, can be used.

Although a pump could be used in certain specific instances to move the gas through the apparatus of this invention, preferably no pump is provided. In this regard, the positive pressure of the landfill gas is used as the impetus for driving the landfill gas through the receiver, the conducting means, the flow meter and the dynamic pressure attenuator to the atmosphere.

The invention, together with additional features and advantages thereof, may best be understood by reference to the following description taken in connection with the accompanying illustrative drawing.

BRIEF DESCRIPTION OF THE DRAWING

FIG. 1 is a side elevational view of one form of apparatus constructed in accordance with the teachings of this invention.

FIG. 2 is an enlarged sectional view taken generally along line 2—2 of FIG. 1.

FIG. 3 is an enlarged fragmentary sectional view taken generally along line 3—3 of FIG. 2.

FIG. 4 is a fragmentary perspective view with portions broken away of the upper regions of the receiver.

FIG. 5 is an elevational view of a second form of apparatus constructed in accordance with the teachings of this invention.

FIG. 6 is a fragmentary sectional view taken generally along line 6—6 of FIG. 5.

FIG. 7 is a perspective view of a preferred form of dynamic pressure attenuator with portions of the housing and porous packing being broken away.

FIGS. 8 and 9 are enlarged fragmentary sectional views taken generally along lines 8—8 and 9—9, respectively, of FIG. 7.

DESCRIPTION OF THE PREFERRED EMBODIMENT

FIGS. 1 and 2 show an apparatus 11 for measuring the flow of gas, such as landfill gas, venting from a surface, such as an upper surface 13, of a landfill 15. The apparatus 11 generally comprises a receiver or flux box 17, conducting means in the form of a conduit 19 leading from the receiver, a flow meter 21 in the conduit 19, and a dynamic pressure attenuator 23 coupled to the downstream end of the conduit.

Although the receiver 17 can be of different constructions, in the embodiment illustrated, it is generally in the form of a truncated pyramid having four side walls 25, a top wall 27 and an opening 29 which is substantially coextensive with the bottom of the receiver. Although many different constructions are possible, in this embodiment, each of the side walls 25 is in the form of a planar laminate comprising an inner panel 31 (FIGS. 2 and 3) suitably bonded to an outer panel 33 of plastic having a highly reflective mirrored outer or external surface 35. The inner panel 31 is constructed of a material, such as acrylic plastic which will not corrode when in contact with the landfill gas.

The side walls 25 are suitably interconnected along their longitudinal edges in any suitable manner, such as by an aluminum angle 37 (FIGS. 3 and 4) which extends along the full length of the interface between confronting edges of adjacent side walls 25 and threaded fasteners 39 which attach the angle 37 to the adjacent side walls, respectively.

The top wall 27 may be constructed of a plastic material, such as acrylic, and it is mounted on the upper ends of the side walls 25 in any suitable manner, such as by threaded fasteners 38 which cooperate with an angle bracket 40 suitably attached to the side walls by fasteners (not shown). Because the side walls 25 converge as they extend away from the opening 29, the top wall 27, in this embodiment is of relatively small cross-sectional area.

With this construction, the receiver 17 provides a flow path 42 which converges as it extends from the opening 29 toward the top wall 27. The flow path 42 is also elongated, and this construction provides minimal internal resistance to the flow of gas therethrough.

The conduit 19 may be in the form of several sections of pipe, such as polyvinylchloride pipe, suitably interconnected by fittings. The inner end of the conduit 19 includes a coupling 41 which extends centrally through the top wall 27 and is joined to the top wall as by bonding. Thus, the flow path 42 extends from the opening 29 to an inner end 43 of the conduit 19 and such inner end is located in close proximity to the top wall 27.

Although other sensitive flow meters which provide low impedance to the flow of gas therethrough can be used, in the embodiment illustrated, the flow meter 21 is in the form of a bubble flow meter. Bubble flow meters are known and disclosed by way of example in *Controlled Test Atmospheres Principles And Techniques*, Gary O. Nelson, P. 27-29, Ann Arbor Science Publishers Inc., 1979. Accordingly, the flow meter 21 is not described in detail herein. Briefly, however, a bubble flow meter includes an apparatus, such as a rubber bulb for introducing a soap bubble from a soap solution into a graduated tube. The gas flowing through the tube pushes the soap bubble along the graduations so that the time required to move the soap bubble between particular graduations can be measured. Because the tube is of known length and volume, the flow rate in, for example feet per minute and the mass flow in, for example, cubic inches per hour can both be determined.

A preferred form of the dynamic pressure attenuator is shown in FIGS. 7-9, and this attenuator forms part of the subject matter of the afore-mentioned co-pending application. This form of pressure attenuator 23 includes a housing 45 which, in the embodiment illustrated, is in the form of a cube formed by four planar side walls 47 (only two being shown in FIG. 7), a top wall 49, and a bottom wall 51, all of which are suitably interconnected to form the cubic housing 45. Of course, the housing can be used in any desired orientation so the top wall 49 need not be the uppermost wall. By way of example, the walls 47, 49 and 51 may be constructed of a suitable plastic, and the conduit 19 is attached to the top wall 49 in any suitable manner, such as by a coupling 53 bonded to the top wall. As shown in FIG. 9, the conduit 19 extends into the interior of the housing 45 and terminates in an open end or housing inlet 55 which preferably lies near the geometrical center of the housing 45. Thus, the gas collected by the receiver 17 flows through the conduit 19 and the flow meter 21 to the interior of the housing 45.

The pressure attenuator 23 also includes three series of conduits or tubes 57, 59 and 61. The tubes 57 extend parallel to each other between the top wall 49 and the bottom wall 51 and have their opposite ends mounted within apertures 63 (FIG. 9) of the top and bottom walls. Thus, the tubes 57 extend generally parallel to the portion of the conduit 19 within the housing 45.

The tubes 59 extend parallel to each other between one pair of opposite side walls 47 and the tubes 61 extend parallel to each other between the other set of opposite side walls 47. Except for certain of the tubes 59 and 61 which intersect the conduit 19 as shown in FIG. 9, these tubes have their ends mounted within apertures 63 of their respective plates and described above for the tubes 57. The tubes 59 and 61 which intersect the conduit 19 within the housing 45 have their inner ends received and mounted within cups 65, each of which is suitably attached to the conduit 19 as by a threaded fastener 67. When mounted in this fashion, the series of tubes 57, 59 and 61 are mutually transverse and would, except for the fact that they are non-intersecting, be mutually perpendicular.

As shown in FIGS. 7 and 9, the tubes 61 are arranged in a series of vertically spaced horizontal rows, and the tubes 59 are similarly arranged in vertically spaced horizontal rows, with the rows of tubes 59 being intermediate the rows of the tubes 61. The tubes 57 are arranged in horizontally spaced vertical rows, and the tubes 57 extend downwardly between the spaces provided by the tubes 59 and 61 to provide symmetry. Preferably, all of the tubes are substantially equally spaced from the adjacent tubes.

With the exception of a few of the tubes 59 and 61 which intersect the conduit 19 within the housing 45, each of the tubes 57, 59 and 61 contains a plurality of openings or ports 69 as shown in FIGS. 8 and 9. The ports 69 are distributed along the length of their respective tubes in several (four being illustrated) axially extending, circumferentially offset rows, with the axes of the ports extending radially of the associated tube. In the embodiment illustrated, the axially extending rows of the ports 69 are circumferentially offset from each other by 90 degrees.

By way of example, the tubes 57, 59 and 61 may nominally be ¾" schedule 40 PVC pipe, and the apertures 69 may be circular apertures with a ¼" diameter and a 2" center-to-center spacing along any given row of the apertures. By way of illustration, the center-to-center spacing between the tubes 57 may be 2¾", and the same spacing may be used between the tubes of the series of tubes 59 and 61. The tubes 59 and 61 which intersect the conduit 19 are imperforate and are not used for dynamic pressure attenuation. Rather, these tubes are essentially support members for the portion of the conduit 19 within the housing 45.

The attenuator 23 includes a porous packing 71 which is optional and which, except for the tubes 57, 59 and 61 and the conduit 19, substantially fills the interior of the housing 45. For example, the packing 71 may be fiberglass. The packing reduces any high frequency dynamic pressure surges that may occur within the housing.

Although the attenuator 23 can be mounted remotely from the receiver 17, it can advantageously be mounted on brackets 73 (FIGS. 1 and 2) attached to the receiver. Although the attenuator 23 can be mounted in different orientations, in the embodiment illustrated, the tubes 59 and 61 extend horizontally.

The purpose of the pressure attenuator is to shield the open end 55 of the conduit 19, as well as the system upstream from the open end 55 from the dynamic pressure of the wind while allowing gas from the conduit 19 to escape to the atmosphere. In use, the tubes 57, 59 and 61 provide smooth, cylindrical wind passages which allow the wind to pass through these tubes regardless of the direction of the wind. As wind passes through any of these tubes, the wind creates a relatively high dynamic pressure within such tubes. However, because the axes of the ports are perpendicular to the direction of flow of the wind through the associated tube, the dynamic pressure in the housing outside the wind passages is greatly reduced and the static pressure in the ports 69 may be essentially zero gage. Thus, the open end 55 is effectively isolated from at least a larger portion of the dynamic pressure created by the wind. Accordingly, the landfill gas exiting from the outlet 55 can flow under only a modest static pressure through the ports 69 and into the tubes 57, 59 and 61. The landfill gas then flows through these tubes and it is discharged to the atmosphere.

In use of the apparatus 11, the receiver 17 is placed on the surface 13 of the landfill 15, with a region of known area of the landfill surface being exposed within the receiver through the opening 29. If desired, soil may be piled around the base of the receiver 17 at the upper surface 13 to improve the seal between the upper surface and receiver. As landfill gas vents from the region of the landfill which is exposed to the interior of the receiver 17, the landfill gas enters the receiver and flows upwardly toward the top wall 27 under the modest positive pressure provided by the gas within the landfill. This same pressure drives the landfill gas through the bubble flow meter 21 so that the flow of the landfill gas, and hence the venting rate, can be determined.

The landfill gas is then forced through the conduit 19 and the inlet 55 into the interior of the housing 45. The attenuator 23 shields the discharging landfill gas from the dynamic pressure created by the wind, and the landfill gas exits to the atmosphere through the ports 69 and the tubes 57–61. If desired, fence-like windshields or a tent-like structure (not shown) may also be used to shield the apparatus 11 from the wind.

FIGS. 5 and 6 show an apparatus 11a which is identical to the apparatus 11 in all respects not shown or described herein. Portions of the apparatus 11a corresponding to portions of the apparatus 11 are designated by corresponding reference numerals followed by the letter "a."

The apparatus 11a is identical to the apparatus 11, except for the construction of the receiver 17a. The receiver 17a is of generally conical configuration and provides a flow path of the same generally conical configuration. More specifically, the receiver 17a has a peripheral wall 75 at least the upper portion of which forms an hyperboloid of revolution. This configuration provides a flow path for the landfill gas which is of somewhat less internal resistance than the flow path 42 of the apparatus 11. The receiver 17a can advantageously be constructed of an upper section 77 and a lower section 79 attached to the upper section by suitable fasteners 81. Each of the sections 77 and 79 may be molded of fiberglass and have an outer surface 35a painted with reflective aluminum paint. The apparatus 11a functions in the same manner described above with respect to the apparatus 11.

Although exemplary embodiments of the invention have been shown and described, many changes, modifications and substitutions may be made by one having ordinary skill in the art without necessarily departing from the spirit and scope of this invention.

I claim:

1. A method of measuring the flow of gas from a surface, said method comprising:

placing a receiver having an opening therein in proximity to said surface so that the gas can flow through the opening and enter the receiver;

conducting the gas from the receiver through a conduit;

measuring the flow of the gas in the conduit; and discharging the gas from the conduit to the atmosphere through a dynamic pressure attenuator with the attenuator materially reducing the effect of the dynamic pressure of the wind on the discharging of the gas.

2. A method as defined in claim 1 wherein the gas vents from the surface under a pressure head and passes through the receiver, the conduit and the wind attenuator as a result of the pressure head.

3. A method as defined in claim 2 wherein said receiver provides a flow path for the gas which extends from said opening to said conduit, said flow path is elongated and converges as it extends away from said opening.

4. A method as defined in claim 1 wherein said receiver has walls that converge toward each other as they extend away from the opening whereby the internal resistance of the receiver to the flow of gas therethrough is reduced.

5. A method as defined in claim 1 wherein said step of measuring is carried out with a bubble flow meter.

6. A method as defined in claim 1 wherein said dynamic pressure attenuator includes a housing having wind passages extending therethrough and said gas is discharged within the housing and flows to the atmosphere through at least one of said wind passages.

7. A method of measuring the flow of landfill gas from surface of a landfill wherein the landfill produces landfill gas at a positive pressure and such positive pressure causes the landfill gas to vent from said surface of the landfill, said method comprising:

placing a receiver having an opening therein on said surface with the opening confronting the surface so that the gas can flow through the opening and enter the receiver as a result of such positive pressure;

conducting the landfill gas from the receiver through a conduit;

measuring the flow of the landfill gas in the conduit; and discharging the landfill gas from the conduit to the atmosphere through a dynamic pressure attenuator with the attenuator materially reducing the effect of the dynamic pressure of the wind on the discharging of the landfill gas.

8. A method as defined in claim 7 wherein said receiver provides a flow path for the gas which extends from said opening to said conduit and said flow path is elongated.

9. A method as defined in claim 7 wherein said receiver provides a flow path for the gas which extends from said opening to said conduit and said flow path converges as it extends away from said opening.

10. A method as defined in claim 7 wherein said step of measuring is carried out with a bubble flow meter.

11. A method as defined in claim 7 wherein said dynamic pressure attenuator includes a housing having wind passages extending therethrough and said landfill gas is discharged within the housing and flows to the atmosphere through at least one of said wind passages.

12. A method as defined in claim 7 wherein the movement of the landfill gas in said steps of conducting and discharging is under the influence of said positive pressure.

13. An apparatus for measuring the flow of gas from a surface, said apparatus comprising:

a receiver having an opening adapted to be placed in proximity to said surface with said opening confronting the surface whereby the gas can flow through the opening into the receiver;

means for conducting the gas from the receiver;

means for measuring the flow of gas in the conducting means;

a dynamic pressure attenuator for receiving the gas from the conducting means and discharging the gas to the atmosphere, said dynamic pressure attenuating means including means for materially reducing the effect of the dynamic pressure of the wind on the discharge rate of the gas.

14. An apparatus as defined in claim 13 wherein said receiver provides a flow path for the gas which extends from said opening to said conducting means and said flow path is elongated.

15. An apparatus as defined in claim 13 wherein said receiver provides a flow path for the gas which extends from said opening to said conducting means and said flow path converges as it extends away from said opening and is elongated.

16. An apparatus as defined in claim 13 wherein said receiver has an exterior surface which is reflective.

17. An apparatus as defined in claim 13 wherein said measuring means includes a bubble flow meter.

18. An apparatus as defined in claim 13 wherein said dynamic pressure attenuator includes a housing having wall means defining wind passages extending through the housing, said conducting means delivers the gas to the interior of said housing, and said dynamic pressure attenuator includes passage means including said wind passages for conducting the gas from the interior of said housing to the atmosphere.

* * * * *